(12) United States Patent
Serencsits et al.

(10) Patent No.: US 12,358,241 B2
(45) Date of Patent: Jul. 15, 2025

(54) SYSTEMS AND METHODS FOR FORMING COMPOSITE STRUCTURES USING RESIN INFUSION

(71) Applicant: The Boeing Company, Arlington, VA (US)

(72) Inventors: William L. Serencsits, Hollywood, SC (US); Jessica O. Fry, Charleston, SC (US); Heather Wadsworth, Ladson, SC (US); David E. Reed, Summerville, SC (US)

(73) Assignee: The Boeing Company, Arlington, VA (US)

( * ) Notice: Subject to any disclaimer, the term of this patent is extended or adjusted under 35 U.S.C. 154(b) by 61 days.

(21) Appl. No.: 18/193,852

(22) Filed: Mar. 31, 2023

(65) Prior Publication Data

US 2024/0326355 A1  Oct. 3, 2024

(51) Int. Cl.
*B29C 70/46* (2006.01)
*B29C 70/44* (2006.01)
*B29C 70/54* (2006.01)

(52) U.S. Cl.
CPC ............ *B29C 70/467* (2013.01); *B29C 70/44* (2013.01); *B29C 70/54* (2013.01)

(58) Field of Classification Search
CPC ....... B29C 33/24; B29C 45/64; B29C 33/202; B29C 33/005; B29C 33/0038; B29C 70/46; B29C 70/461
See application file for complete search history.

(56) References Cited

U.S. PATENT DOCUMENTS

| | | | | |
|---|---|---|---|---|
| 2,663,251 A | * | 12/1953 | Baumrucker, Jr. ...... | B41D 3/00 |
| | | | | 101/401.1 |
| 2,847,712 A | * | 8/1958 | Harold ..................... | G06G 1/04 |
| | | | | 264/308 |
| 2,965,074 A | * | 12/1960 | Williamson ......... | B23Q 16/008 |
| | | | | 188/269 |

(Continued)

FOREIGN PATENT DOCUMENTS

| | | | | |
|---|---|---|---|---|
| CN | 102672919 A | * | 9/2012 | ............. B29C 45/56 |
| DE | 102015114786 A1 | | 3/2017 | |

(Continued)

OTHER PUBLICATIONS

English translation of CN-102672919-A (published Sep. 19, 2012). (Year: 2012).*

(Continued)

*Primary Examiner* — Matthew J Daniels
(74) *Attorney, Agent, or Firm* — Walters & Wasylyna LLC

(57) ABSTRACT

A system for forming a composite structure includes a tool for infusing a dry preform with a resin. The tool includes a tool base and a tool lid. The tool base includes a base surface. The tool lid includes a lid surface. The system includes an adjustable stop that is positioned between the tool base and the tool lid. The base surface and the lid surface form a portion of a tool cavity. The tool lid is movable relative to the tool base to generate an internal pressure within the tool cavity. The adjustable stop controls a tool position of the tool lid relative to the tool base to achieve a predetermined value for the internal pressure.

20 Claims, 13 Drawing Sheets

(56) References Cited

U.S. PATENT DOCUMENTS

| | | | | |
|---|---|---|---|---|
| 3,132,378 | A * | 5/1964 | Johannigman | B30B 15/32 |
| | | | | 425/DIG. 129 |
| 3,694,541 | A * | 9/1972 | Gelin | B29C 43/00 |
| | | | | 264/294 |
| 3,989,432 | A * | 11/1976 | Depka | B28B 13/06 |
| | | | | 425/444 |
| 4,076,780 | A * | 2/1978 | Ditto | B30B 15/007 |
| | | | | 264/40.5 |
| 4,557,889 | A * | 12/1985 | Masuda | B29C 43/14 |
| | | | | 264/320 |
| 7,081,219 | B2 | 7/2006 | Stewart | |
| 2001/0052654 | A1 * | 12/2001 | Saddler | B28B 15/005 |
| | | | | 425/432 |
| 2004/0018266 | A1 * | 1/2004 | Clarke | B29C 45/02 |
| | | | | 425/562 |
| 2006/0220273 | A1 * | 10/2006 | Armstrong | B29C 43/18 |
| | | | | 425/398 |
| 2018/0029315 | A1 * | 2/2018 | Howland | B29C 70/467 |
| 2020/0079036 | A1 | 3/2020 | Niesner | |
| 2020/0215769 | A1 | 7/2020 | Plante et al. | |
| 2021/0001522 | A1 * | 1/2021 | Yoda | B29C 44/10 |
| 2021/0221075 | A1 | 7/2021 | Hatta | |
| 2021/0299919 | A1 * | 9/2021 | Hatta | B29C 43/183 |

FOREIGN PATENT DOCUMENTS

| | | |
|---|---|---|
| DE | 102021000926 A1 | 8/2022 |
| EP | 1150827 B1 | 5/2003 |
| WO | 2010059514 A2 | 5/2010 |
| WO | WO 2022/081861 | 4/2022 |
| WO | WO 2022/081884 | 4/2022 |

OTHER PUBLICATIONS

European Patent Office, Extended European Search Report, App. No. 24156249.5 (Jun. 20, 2024).

European Patent Office, "Communication pursuant to Article 94(3) EPC," App. No. 24156249.5 (Apr. 7, 2025).

* cited by examiner

SYSTEMS AND METHODS FOR FORMING COMPOSITE STRUCTURES USING RESIN INFUSION

FIELD

The present disclosure relates generally to composite manufacturing and, more particularly, to systems and methods for forming composite structures using high-rate resin infusion.

BACKGROUND

Composite materials and structures, including resin-infused fiber-reinforced laminates, are commonly used in applications requiring high strength and light weight. Conventional systems and methods for forming composite structures are often time- and labor-intensive. Further, systems and methods for producing high-quality composite structures at high rates require precisely machined tooling and utilize processing equipment with hard stops to control cure pressure and part thickness. However, fabricating high-quality composite structures that meet desired performance characteristics at high rates using current production systems and methods is difficult and expensive. Accordingly, those skilled in the art continue with research and development efforts in the field of composite manufacturing.

SUMMARY

Disclosed are examples of a system for forming a composite structure, a tool for forming a composite structure, and a method for forming a composite structure. The following is a non-exhaustive list of examples, which may or may not be claimed, of the subject matter according to the present disclosure.

In an example, the disclosed system includes a tool for infusing a dry preform with a resin. The tool includes a tool base and a tool lid. The tool base includes a base surface. The tool lid includes a lid surface. The system includes an adjustable stop that is positioned between the tool base and the tool lid. The base surface and the lid surface form a portion of a tool cavity. The tool lid is movable relative to the tool base to generate an internal pressure within the tool cavity. The adjustable stop controls a tool position of the tool lid relative to the tool base to achieve a predetermined value for the internal pressure.

In an example, the disclosed tool includes a tool base that includes a base surface. The tool includes a tool lid that includes a lid surface. The tool includes an adjustable stop that is positioned between the tool base and the tool lid. The base surface and the lid surface form a portion of a tool cavity. A dry preform is infused with a resin within the tool cavity to form a resin-infused preform. The tool lid is movable relative to the tool base to generate a predetermined pressure across the resin-infused preform. The adjustable stop controls a tool position of the tool lid relative to the tool base to maintain the predetermined pressure during cure of the resin-infused preform.

In an example, the disclosed method includes steps of: (1) infusing a dry preform with a resin to form a resin-infused preform within a tool cavity of a tool; and (2) maintaining a predetermined pressure across the resin-infused preform during cure.

Other examples of the system, the tool, and the method disclosed herein will become apparent from the following detailed description, the accompanying drawings, and the appended claims.

DETAILED DESCRIPTION

Referring generally to FIGS. 1A, 1B and 2-10, by way of examples, the present disclosure is directed to a system 100 for forming a composite structure 200. As will be described in more detail herein, the system 100 provides tool control for maintaining a predetermined pressure or force on a resin-infused fiber-reinforced composite part during cure. Curing of the resin-infused part may also referred to herein as a cure process, a cure cycle, or a cure operation.

The present disclosure recognizes that a resin infusion process requires constant, isostatic pressure to be maintained across a resin-infused fiber-reinforced composite part for a predetermined curing time (e.g., approximately 30 minutes) while the resin cures. During the cure process, the resin transforms from a liquid state to a solid state by increased crosslinking in the polymer chains. This transformation can result in a small (e.g., approximately 1% to 2% or more) decrease in the volume of the resin during the cure process. This decrease in volume can result in a decrease in pressure across the resin-infused fiber-reinforced composite part during the cure process. This decrease in pressure can result in defects or other quality issues across the surface of the resin-infused fiber-reinforced composite part.

The system 100 provides a predetermined (e.g., constant) isostatic pressure to a resin-infused preform by balancing pressure and/or forces applied to the resin-infused preform and by controlling a position of tooling during infusion of a dry preform with resin and cure of the resin-infused preform. By balancing pressure and/or forces applied to the resin-infused preform and by controlling the position of a tooling, the system 100 accounts for a volumetric decrease, also referred to as shrinkage, of the resin-infused preform during cure to provide a high quality cured composite part.

Figure 1A:
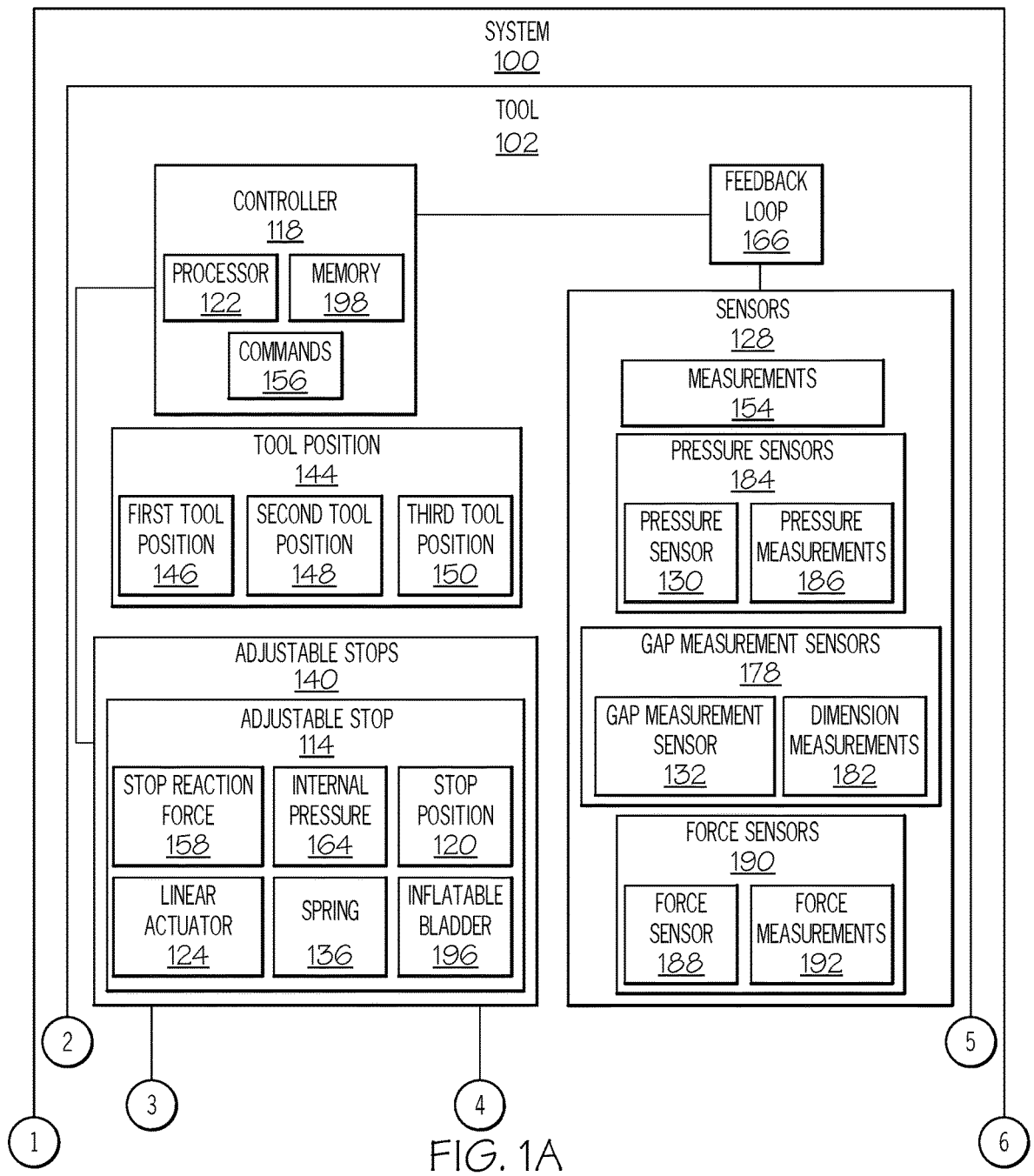
FIGS. 1A and 1B, in combination, are a schematic, block diagram of an example of system for forming a composite structure.
Figure 1B:
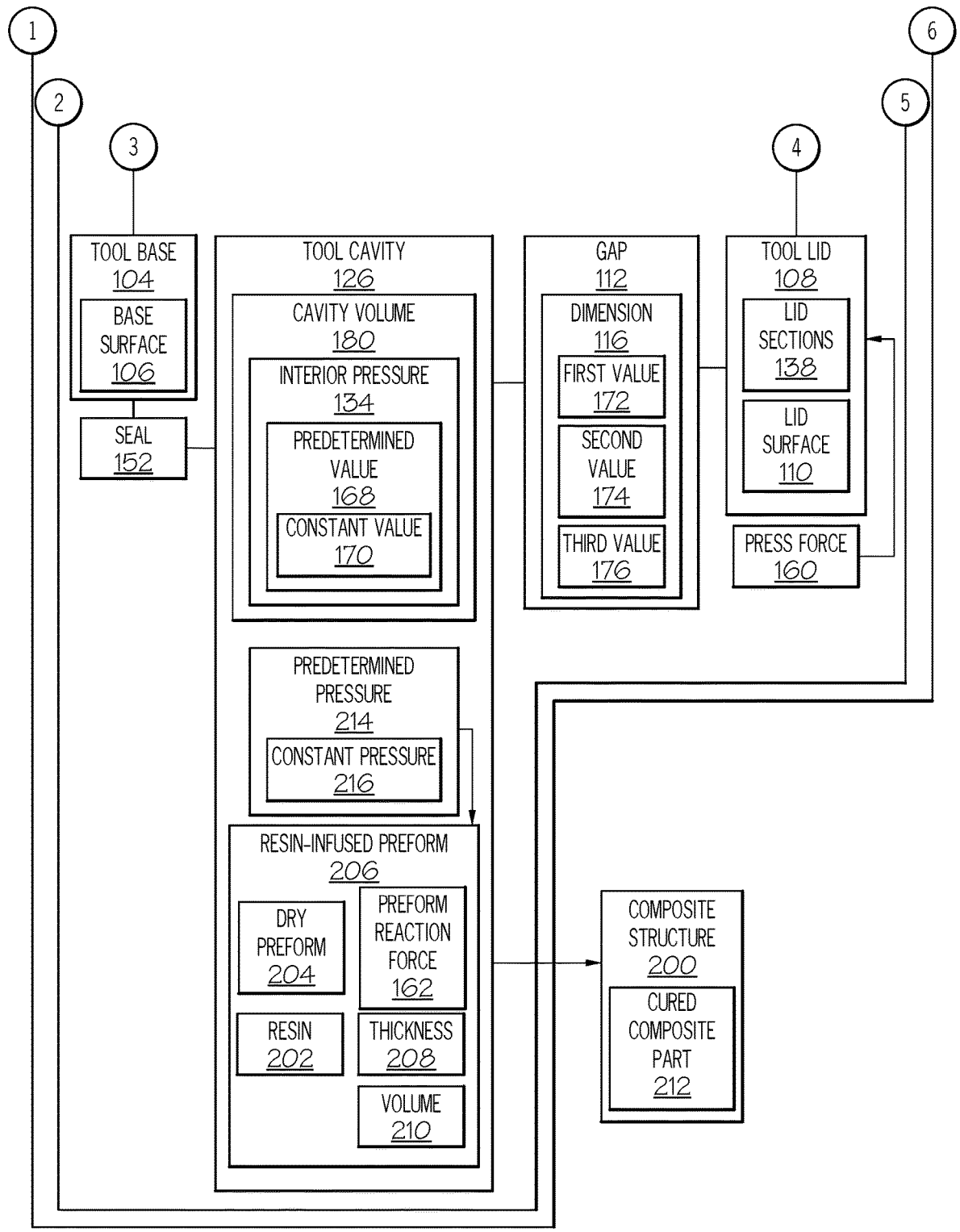

Referring to FIGS. 1A and 1B, in one or more examples, the system 100 includes a tool 102 for infusing a dry preform 204 with a resin 202 to form a resin-infused preform 206 and for curing the resin-infused preform 206 to form a composite structure 200. The tool 102 includes a tool base 104 and a tool lid 108. The tool base 104 includes a base surface 106. The tool lid 108 includes a lid surface 110. The system 100 also includes an adjustable stop 114. The adjustable stop 114 is positioned or disposed between the tool base 104 and the tool lid 108. The base surface 106 and the lid surface 110 form a portion of a tool cavity 126. The dry preform 204 is infused with the resin 202 within the tool cavity 126 to form the resin-infused preform 206. The tool lid 108 is movable relative to the tool base 104 to generate an interior pressure 134 within the tool cavity 126 and, thus, to generate a predetermined pressure 214 across the resin-infused preform 206. The adjustable stop 114 controls a tool position 144 of the tool lid 108 relative to the tool base 104 to achieve and/or maintain a predetermined value 168 for the interior pressure 134 and, thus, to maintain the predetermined pressure 214 during cure of the resin-infused preform 206.

In one or more examples, the interior pressure 134 of the tool cavity 126 is, refers to, or corresponds to the predetermine pressure 214 across the resin-infused preform 206. In one or more examples, the predetermined value 168 for the interior pressure 134 of the tool cavity 126 is a constant value 170. As such, in one or more examples, the predetermined pressure 214 applied and maintained across the resin-infused preform 206 during cure is a constant pressure 216.

In one or more examples, the system 100 includes a plurality of adjustable stops 140. In these examples, each one of the adjustable stops 140 is positioned or disposed between the tool base 104 and the tool lid 108. The adjustable stops 140, in combination or in coordination, control the tool position 144 of the tool lid 108 relative to the tool base 104 to achieve and/or maintain the predetermined value 168 for the interior pressure 134 and, thus, to maintain the predetermined pressure 214 during cure of the resin-infused preform 206.

Generally, the tool 102 may also be referred to as a mold or a mold tool. The tool base 104 may also be referred to as a first mold, a lower mold, or fixed (e.g., stationary) mold. The tool lid 108 may also be referred to as a second mold, an upper mold, or movable mold. For the purpose of the present disclosure, the interior pressure 134 of the tool cavity 126 includes, refers to, or otherwise corresponds to the pressure applied to or across the resin-infused preform 206 disposed within the tool cavity 126 during infusion of the dry preform 204 with the resin 202 and/or during cure of the resin-infused preform 206.

Figure 2:
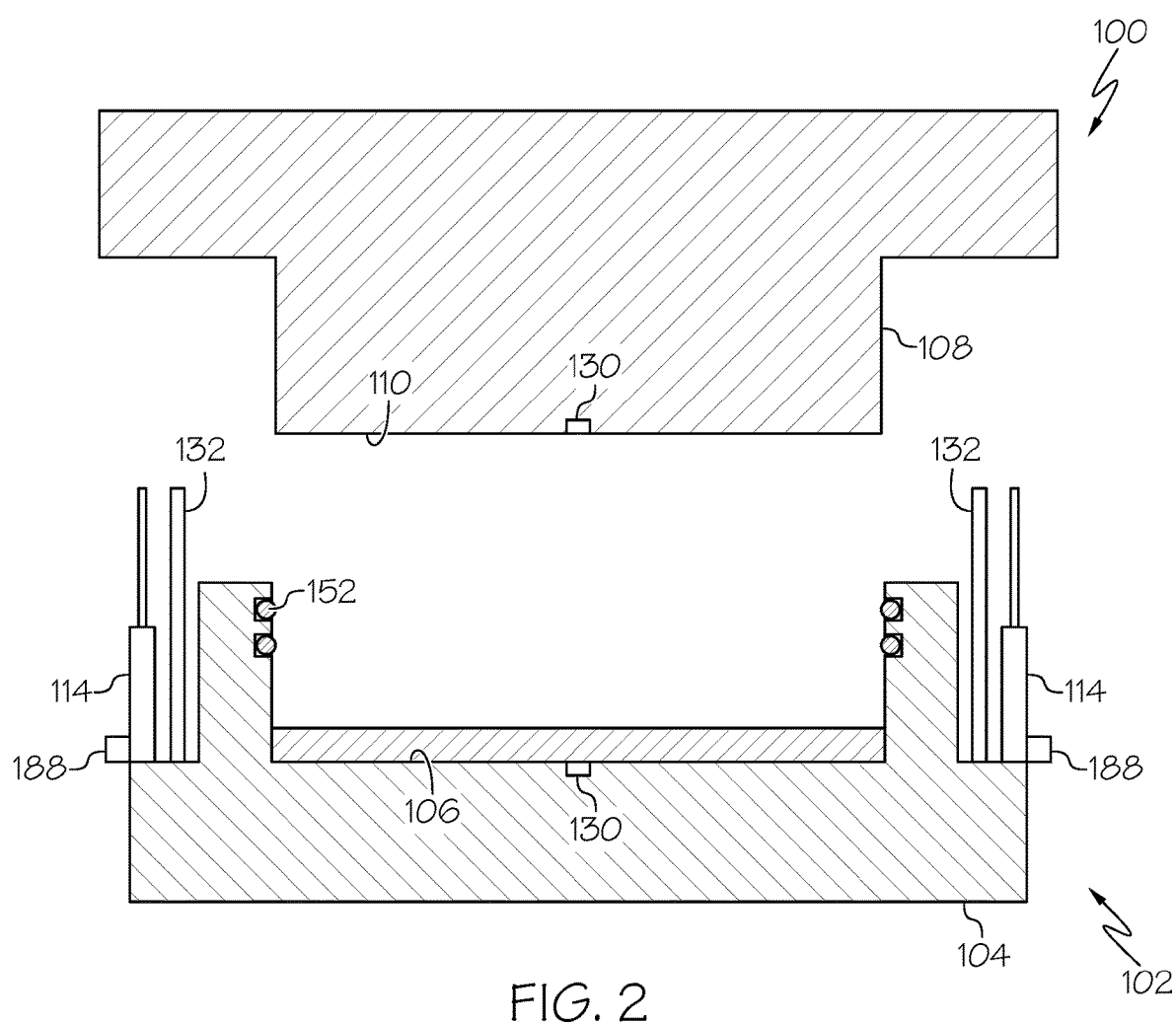
FIG. 2 is schematic, sectional, end view of an example of a tool for forming a composite structure depicted in FIGS. 1A and 1B, shown in an open state.
Figure 3:
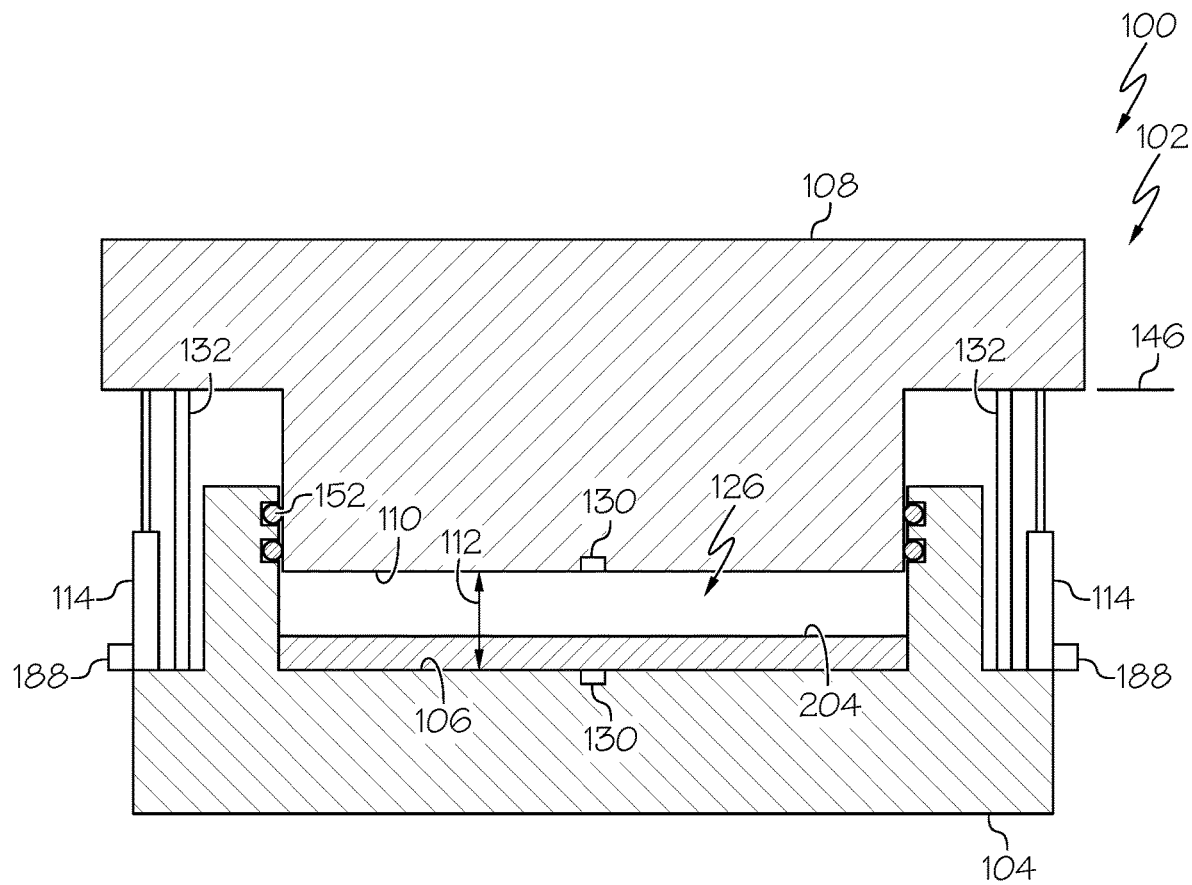
FIG. 3 is a schematic, sectional, end view of an example of the tool depicted in FIGS. 1A and 1B, shown in a closed state.

FIG. 2 schematically illustrates an example of the tool 102 in an open state. FIG. 3 schematically illustrates an example of the tool 102 in a closed state. Generally, the tool lid 108 is movable relative to the tool base 104 such that the tool 102 is in the open state (FIG. 2) or the closed state (FIG. 3). In one or more example, with the tool 102 in the open state, the dry preform 204 (FIG. 3) is placed on the base surface 106. In one or more examples, with the tool 102 in the closed state, the tool lid 108 is placed over the tool base 104 to create the tool cavity 126, which is sealed (e.g., a sealed cavity), for example, by one or more seals 152.

Figure 4:
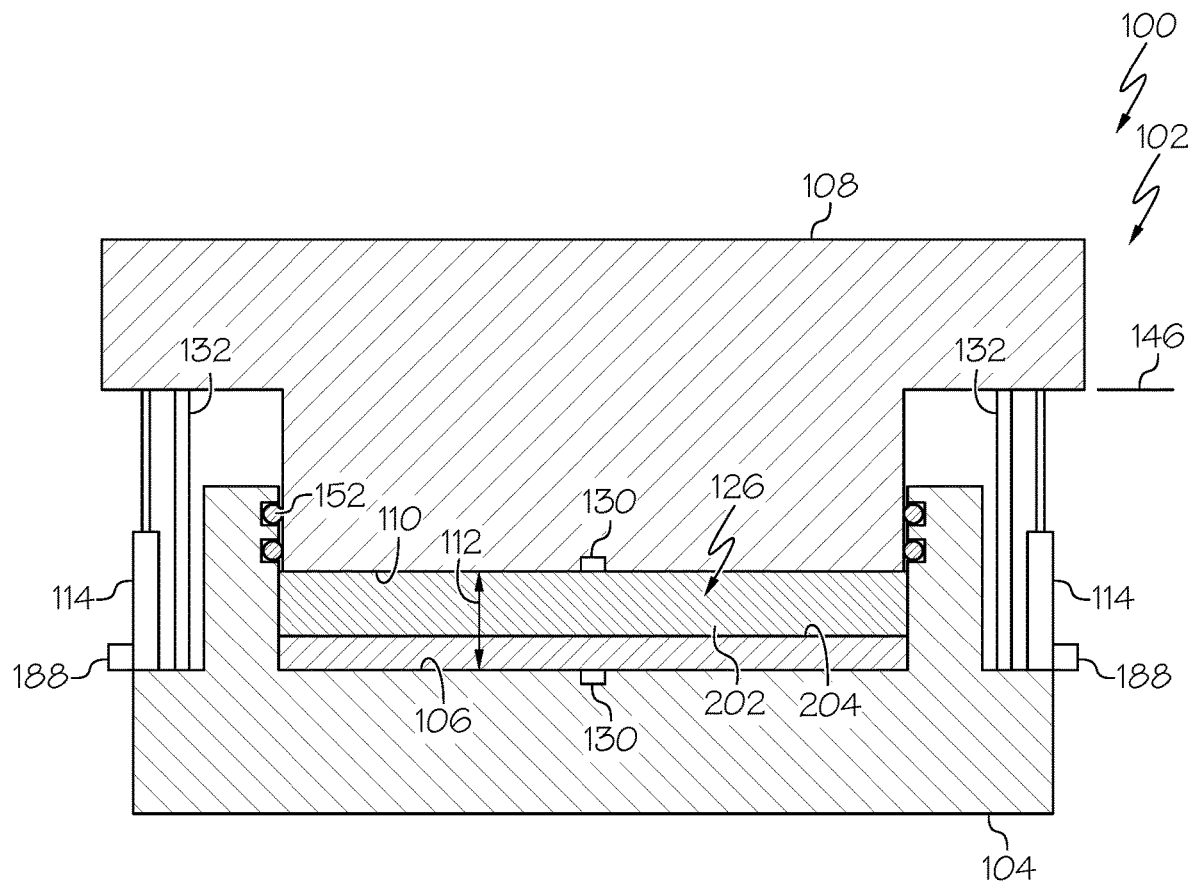
FIG. 4 is a schematic, sectional, end view of an example of the tool depicted in FIGS. 1A and 1B, shown in a first tool position.

FIG. 4 schematically illustrates an example of the tool 102 in the closed state and the tool lid 108 in a first tool position 146 for resin injection. With the tool 102 in the closed state, the tool cavity 126 defines a gap 112. In one or more examples, with the tool lid 108 in the first tool position 146, the resin 202 is injected into the gap 112 of the tool cavity 126 and flows over and across the dry preform 204. In one or more examples, with the tool lid 108 in the first tool position 146, the gap 112 corresponds to a cavity volume 180 that is at least approximately equivalent to an amount (e.g., a volume) of the resin 202 sufficient to infuse the dry preform 204.

Figure 5:
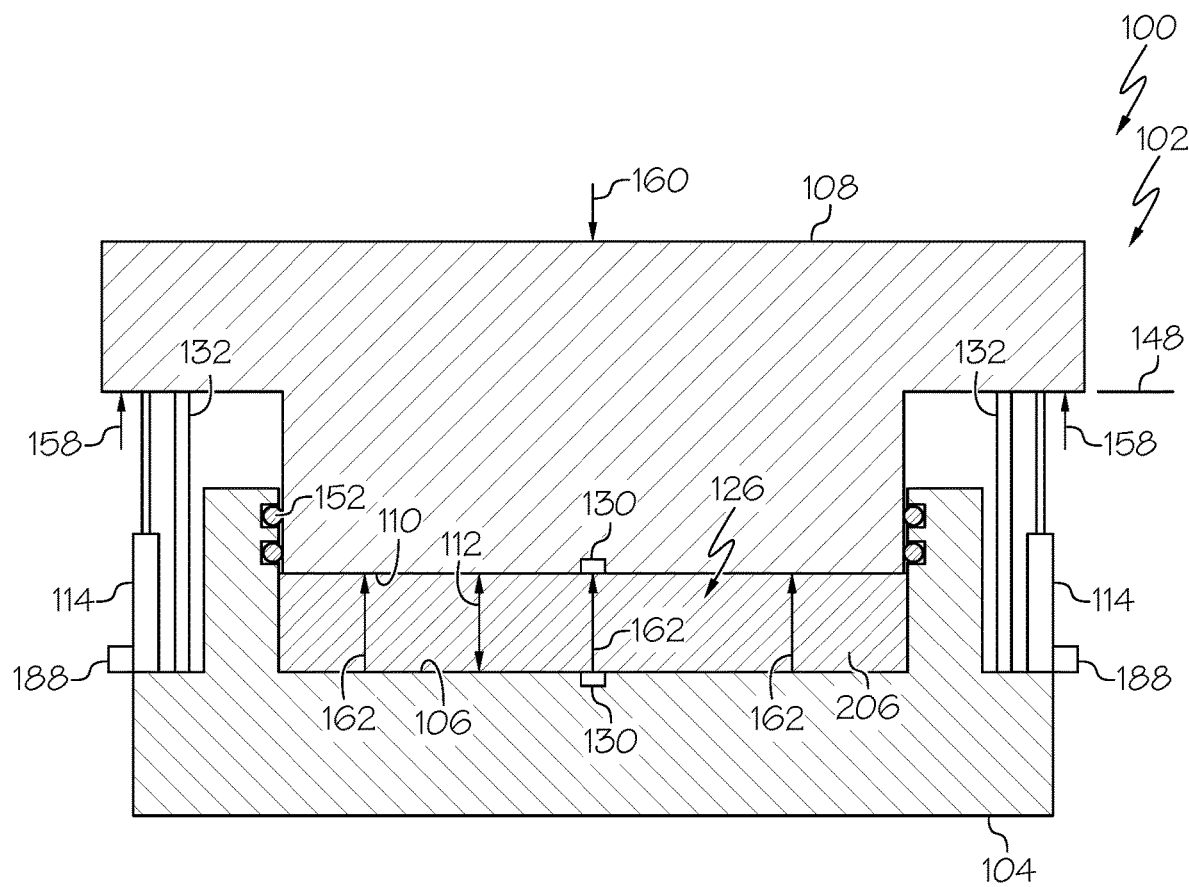
FIG. 5 is a schematic, sectional, end view of an example of the tool depicted in FIGS. 1A and 1B, shown in a second tool position.

FIG. 5 schematically illustrates an example of the tool 102 in the closed state and the tool lid 108 in a second tool position 148 for resin infusion and an initial portion of a curing process. In one or more examples, with the tool lid 108 in the second tool position 148, the dry preform 204 is infused with the resin 202 within the tool cavity 126 to form the resin-infused preform 206. In one or more examples, the tool lid 108 is lowered (e.g., from the first tool position 146 to the second tool position 148) to close the gap 112 such that the tool lid 108 applies an infusion pressure (e.g., the predetermined pressure 214) to help infuse the dry preform 204 with the resin 202 for a predetermined infusion time. In one or more examples, with the tool lid 108 in the second tool position 148, the gap 112 corresponds to a desired thickness (e.g., thickness 208) of the resin-infused preform 206.

In one or more examples, the first tool position 146 and the second tool position 148 are the same, such that the gap 112 remains the same during injection of the resin 202 and infusion of the resin 202. In one or more examples, the first tool position 146 and the second tool position 148 are different, such that the gap 112 changes (e.g., is reduced) during injection of the resin 202 and infusion of the resin 202.

In one or more examples, with the tool lid 108 in the second tool position 148, curing of the resin-infused preform 206 commences. In one or more examples, after infusion and with the tool lid 108 in the second tool position 148, the tool lid 108 also applies a curing pressure (e.g., the predetermined pressure 214) to the resin-infused preform 206 for a predetermined curing time. For example, with the tool lid 108 in the second tool position 148, the tool lid 108 applies the predetermined pressure 214 across the resin-infused preform 206.

Figure 6:
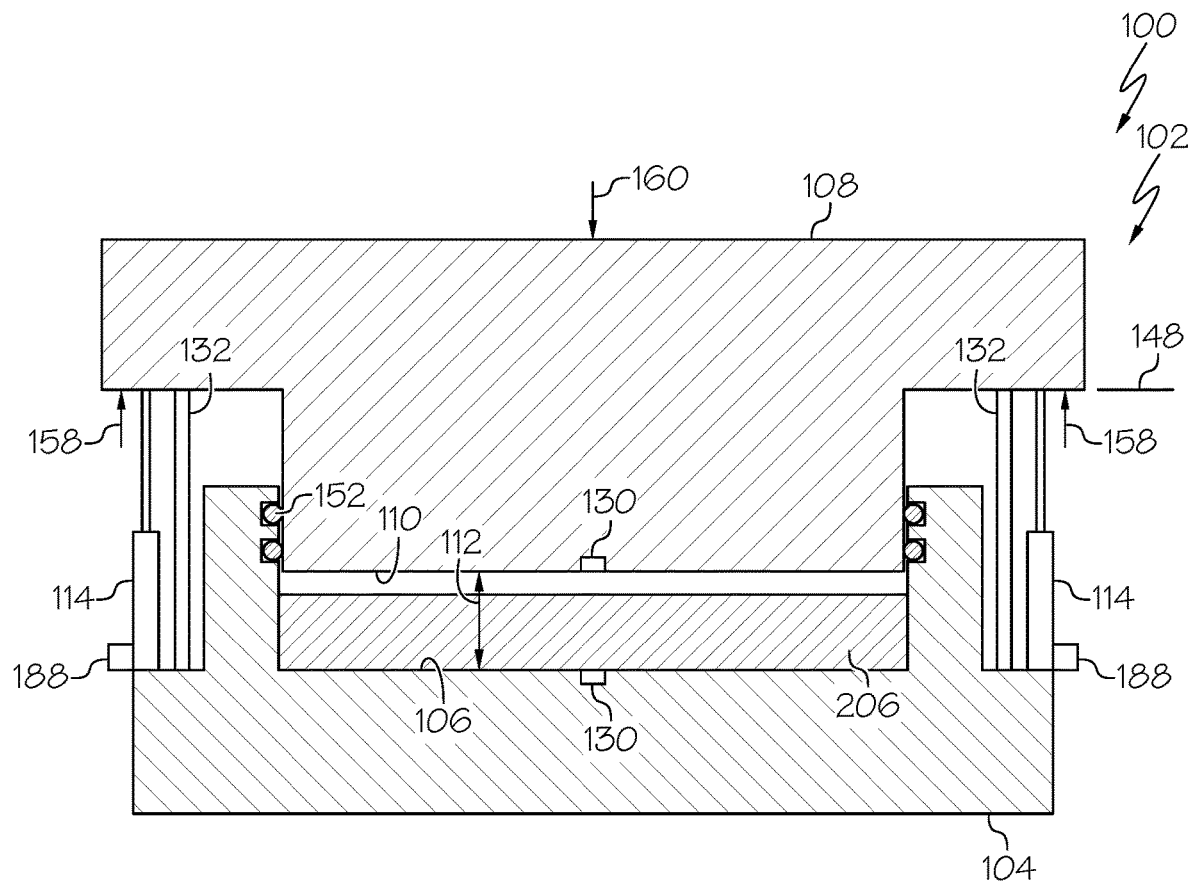
FIG. 6 is a schematic, sectional, end view of an example of the tool depicted in FIGS. 1A and 1B, shown in the second tool position.

FIG. 6 schematically illustrates an example of the of the tool 102 in the closed state and the tool lid 108 in a second tool position 148 during cure. In one or more examples, the volume 210 of the resin-infused preform 206 decreases to some degree during cure. As such, during the curing process, with the tool lid 108 in the second tool position 148, the gap 112 corresponds to a cavity volume 180 that is greater than the volume 210 of the resin-infused preform 206. For example, as the resin-infused preform 206 shrinks, the lid surface 110 of the tool lid 108 may no longer be in contact with a surface of the resin-infused preform 206 and/or the tool lid 108 may no longer be applying a sufficient force upon the resin-infused preform 206.

Figure 7:
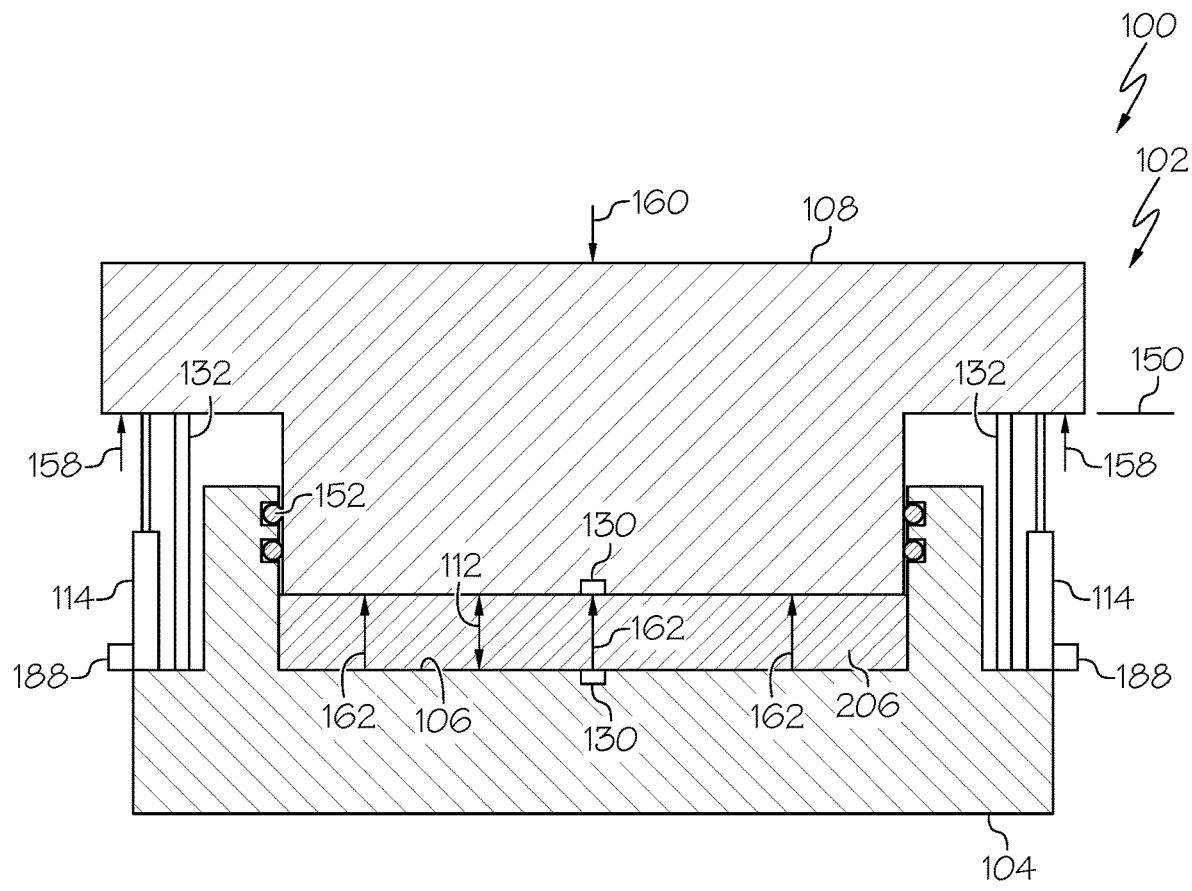
FIG. 7 is a schematic, sectional, end view of an example of the tool depicted in FIGS. 1A and 1B, shown in a third tool position.

FIG. 7 schematically illustrates an example of the tool 102 in the closed state and the tool lid 108 in a third tool position 150 during curing. In one or more examples, the tool lid 108 is lowered (e.g., from the second tool position 148 to the third tool position 150) to close the gap 112 such that the tool lid 108 continues to apply the curing pressure, thereby maintaining the predetermined pressure 214 throughout the curing process as the volume 210 of the resin-infused preform 206 decreases. In one or more examples, with the tool lid 108 in the third tool position 150, the gap 112 once again corresponds to a cavity volume 180 that is at least approximately equivalent to the volume 210 of the resin-infused preform 206.

In one or more examples, the tool lid 108 continues to apply the curing pressure (e.g., the predetermined pressure 214) to the resin-infused preform 206 for a remainder of the predetermined curing time. In one or more examples, the tool lid 108 can be further lowered (e.g., from the third tool position 150 to a fourth tool position, from the fourth tool position to a fifth tool position, and so on, as needed) to close the gap 112 such that the tool lid 108 continues to apply the curing pressure, thereby maintaining the predetermined pressure 214 throughout the curing process as the volume 210 of the resin-infused preform 206 decreases.

As will be described below, control of the tool position 144 (e.g., from the first tool position 146 to the second tool position 148, from the second tool position 148 to the third tool position 150, and so on, as needed) to achieve and maintain the predetermined value 168 for the interior pressure 134 of the tool cavity 126 and, thus, the predetermined pressure 214 across the resin-infused preform 206 is implemented using the adjustable stop 114. As will be described in more detail below, control of the adjustable stop 114 is provided by any one of various techniques, including an active control technique and a passive control technique.

Referring to FIGS. 1A and 1B, in one or more examples, the adjustable stop 114 controls the tool position 144 of the tool lid 108 relative to the tool base 104 to selectively control a dimension 116 of the gap 112 between the base surface 106 and the lid surface 110. The dimension 116 of the gap 112 is a linear distance between the base surface 106 and the lid surface 110. The gap 112 corresponds to the cavity volume 180 of the tool cavity 126.

In one or more examples, the adjustable stop 114 sets the tool position 144 of the tool lid 108 relative to the tool base 104 to achieve a first predetermined value 172 for the dimension 116 of the gap 112 for injection and/or infusion of the resin 202. In one or more examples, the first predetermined value 172 for the dimension 116 of the gap 112 corresponds to the first tool position 146 (e.g., FIGS. 3 and 4).

In one or more examples, the adjustable stop 114 adjusts the position of the tool lid 108 relative to the tool base 104 to achieve a second predetermined value 174 for the dimension 116 of the gap 112 for infusion of the resin 202 and/or cure of the resin-infused preform 206. In one or more examples, the second predetermined value 174 for the dimension 116 of the gap 112 corresponds to the thickness 208 of the resin-infused preform 206. In one or more examples, the second predetermined value 174 for the dimension 116 of the gap 112 corresponds to the second tool position 148 (e.g., FIGS. 5 and 6).

In one or more examples, the adjustable stop 114 adjusts the position of the tool lid 108 relative to the tool base 104 to achieve a third predetermined value 176 for the dimension 116 of the gap 112 for cure of the resin-infused preform 206 after some degree of volumetric decrease (e.g., shrinkage). In one or more examples, the third predetermined value 176 for the dimension 116 of the gap 112 corresponds to the reduction in the volume 210 of the resin-infused preform 206 during cure. In one or more examples, the third predetermined value 176 for the dimension 116 of the gap 112 corresponds to the third tool position 150 (e.g., FIG. 7).

In one or more examples, the system 100 includes a gap measurement sensor 132. The gap measurement sensor 132 measures the dimension 116 of the gap 112 between the base surface 106 and the lid surface 110. In one or more examples, the gap measurement sensor 132 is positioned between the tool base 104 and the tool lid 108. With the tool 102 in the closed state, the gap measurement sensor 132 detects the tool position 144 and, thus, detects or determines the dimension 116 of the gap 112 between the base surface 106 and the lid surface 110 based on the tool position 144.

In one or more examples, the system 100 includes a plurality of gap measurement sensors 178. In one or more examples, each one of the gap measurement sensors 178 measures the dimension 116 of the gap 112 between the base surface 106 and the lid surface 110, such as corresponding to one of the plurality of adjustable stops 140.

The gap measurement sensor 132, such as any one of the plurality of gap measurement sensors 178, may include or take the form of any suitable sensor, detector, or dimensional measurement tool or gauge that measures a gap or clearance. The gap measurement sensor 132, such as any one of the plurality of gap measurement sensors 178, may be a contact measurement device or a non-contact measurement device. The gap measurement sensor 132, such as any one of the plurality of gap measurement sensors 178, generates a dimension measurement 182.

In one or more examples, the adjustable stop 114 controls movement of the tool lid 108 relative to the tool base 104 to selectively control the interior pressure 134 within the tool cavity 126 and, thus, the predetermined pressure 214 across the resin-infused preform 206. In one or more examples, the adjustable stop 114 adjusts or controls the tool position 144 of the tool lid 108 relative to the tool base 104 to maintain the constant value 170 for the interior pressure 134 and, thus, the constant pressure 216 across the resin-infused preform 206.

In one or more examples, the tool position 144 is actively controlled using the adjustable stop 114 based on detection and/or monitoring of the dimension 116 of the gap 112 over time during cure and a model of the resin-infused preform 206. The model of the resin-infused preform 206 represents and correlates changes in the thickness 208 and/or volume 210 of the resin-infused preform 206 over time during cure, such as a look-up table, mathematical model, or computer model. In these examples, the adjustable stop 114 automatically adjusts the tool position 144 (e.g., lowers the tool lid 108) to change (e.g., reduce) the dimension 116 of the gap 112 at predetermined times or at a predetermined rate over the predetermined curing time, according to the model, to maintain the constant value 170 for the interior pressure 134 and, thus, the constant pressure 216 across the resin-infused preform 206.

Generally, during infusion and cure, a press force 160 is applied to the tool lid 108 to move the tool lid 108 relative to the tool base 104 (e.g., at different instances of the tool position 144). The tool lid 108 applied the press force 160 to the resin-infused preform 206 and the adjustable stop 114. The press force 160 is related to the interior pressure 134 of the tool cavity 126 and, thus, the pressure and/or force applied across the resin-infused preform 206. The resin-infused preform 206 applies a preform reaction force 162 to the tool lid 108 in response to the press force 160. The adjustable stop 114 applies a stop reaction force 158 to the tool lid 108 in response to the press force 160. During infusion and cure, it is desirable for a sum of the preform reaction force 162 and the stop reaction force 158 to be approximately equal to the press force 160, which results in the desired isostatic pressure being applied to the resin-infused preform 206 during the cure process. It can be appreciated that as the volume 210 of the resin-infused preform 206 decreases during cure, the preform reaction force 162 applied to the tool lid 108 by the resin-infused preform 206 decreases. This, in turn, causes an increase in the stop reaction force 158 applied to the tool lid 108 by the adjustable stop 114 needed to hold the tool lid 108 in the tool position 144. To maintain the interior pressure 134 of the tool cavity 126 at the predetermined value 168 (e.g., the constant value 170) and, thus, the predetermined pressure 214 (e.g., the constant pressure 216) across the resin-infused preform 206, the stop reaction force 158 is sufficiently decreased to enable the tool lid 108 to be further lowered until the sum of the preform reaction force 162 and the stop reaction force 158 are again approximately equal to the press force 160.

In one or more examples, the tool position 144 is actively controlled using the adjustable stop 114 based on detection of, determination of, and/or changes in the interior pressure 134. In one or more of these examples, the system 100 includes a pressure sensor 130. In one or more examples, the pressure sensor 130 measures the interior pressure 134 within the tool cavity 126. In one or more examples, one or more of the pressure sensors 184 measure the pressure or force applied across the resin-infused preform 206. In these examples, the adjustable stop 114 automatically adjusts the tool position 144 (e.g., lowers the tool lid 108) in response to a detected change or reduction in the interior pressure 134 and, thus, a reduction in the pressure and/or force being applied across the resin-infused preform 206 to maintain the constant value 170 for the interior pressure 134 and, thus, the constant pressure 216 across the resin-infused preform 206.

In one or more examples, the system 100 includes a plurality of pressure sensors 184. In one or more examples, one or more of the pressure sensors 184 measures the interior pressure 134 of the tool cavity 126. In one or more examples, one or more of the pressure sensors 184 measure the pressure or force applied across the resin-infused preform 206.

The pressure sensor 130, such as any one of the plurality of pressure sensors 184, may include or take the form of any suitable sensor, detector, or pressure or force measurement tool or gauge that measures a pressurized gas, an applied force, or a reaction force. The pressure sensor 130, such as any one of the plurality of pressure sensors 184, may be a contact measurement device or a non-contact measurement device. The pressure sensor 130, such as any one of the plurality of pressure sensors 184, generates a pressure measurement 186. In one or more examples, the pressure sensor 130, such as any one of the plurality of pressure sensors 184, is disposed on one or both of the base surface 106 and/or the lid surface 110. In one or more examples, the pressure sensor 130, such as any one of the plurality of pressure sensors 184 is in communication (e.g., fluid communication) with the tool cavity 126.

In one or more examples, the tool position 144 is actively controlled using the adjustable stop 114 based on detection of, determination of, and/or changes in an internal pressure 164 within the adjustable stop 114 or the stop reaction force 158 applied by the adjustable stop 114. In one or more of these examples, the system 100 includes a force sensor 188. In one or more examples, the force sensor 188 measures the internal pressure 164 within the adjustable stop 114 or the stop reaction force 158 being applied by the adjustable stop 114. In these examples, the adjustable stop 114 automatically adjusts the tool position 144 (e.g., lowers the tool lid 108) in response to a detected change (e.g., increase) in the internal pressure 164 within the adjustable stop 114 or the stop reaction force 158 being applied by the adjustable stop 114, which correspond to a reduction in the interior pressure 134 and, thus, a reduction in the pressure and/or force being applied across the resin-infused preform 206, to maintain the constant value 170 for the interior pressure 134 and, thus, the constant pressure 216 across the resin-infused preform 206.

In one or more examples, the system 100 includes a plurality of force sensors 190. In one or more examples, each one of the force sensors 190 corresponds to and/or measures the internal pressure 164 within the adjustable stop 114 or the stop reaction force 158 being applied by the adjustable stop 114 of a corresponding one of the plurality of adjustable stops 140.

The force sensor 188, such as any one of the plurality of force sensors 190, may include or take the form of any suitable sensor, detector, or pressure or force measurement tool or gauge that measures an internal pressure of a cylinder, an applied load or force, or a reaction force. The force sensor 188, such as any one of the plurality of force sensors 190, may be a contact measurement device or a non-contact measurement device. The force sensor 188, such as any one of the plurality of force sensors 190, generates a force measurement 192. In one or more examples, the force sensor 188, such as any one of the plurality of force sensors 190, is coupled to, is disposed in, or is in communication with a corresponding one of the plurality of adjustable stops 140.

In one or more examples, the tool position 144 is passively controlled using the adjustable stop 114 based on balancing of forces. In one or more examples, the adjustable stop 114 reacts to the tool lid 108 to maintain the constant value 170 for the interior pressure 134 and, thus, the constant pressure 216 across the resin-infused preform 206. In one or more of these examples, the stop reaction force 158 is set at a predetermined value to balance the forces between the press force 160 and the sum of the preform reaction force 162 and the stop reaction force 158. For example, when the preform reaction force 162 decreases and, thus, the interior pressure 134 of the tool cavity 126 and the pressure and/or force applied to the resin-infused preform 206 decreases, the press force 160 overcomes the stop reaction force 158, which in turn enables the tool lid 108 to lower until the sum of the sum of the preform reaction force 162 and the stop reaction force 158 is again at least approximately equal to the press force 160. Upon a balance of the forces, the tool lid 108 is held at the tool position 144 by the adjustable stop 114 to maintain the constant value 170 for the interior pressure 134 and, thus, the constant pressure 216 across the resin-infused preform 206.

Referring to FIGS. 1A and 1B, in one or more examples, the system 100 includes a controller 118. The controller 118 communicates with the adjustable stop 114 to instruct at least one of a stop position 120 of the adjustable stop 114 and the stop reaction force 158 applied by the adjustable stop 114.

Figure 8:
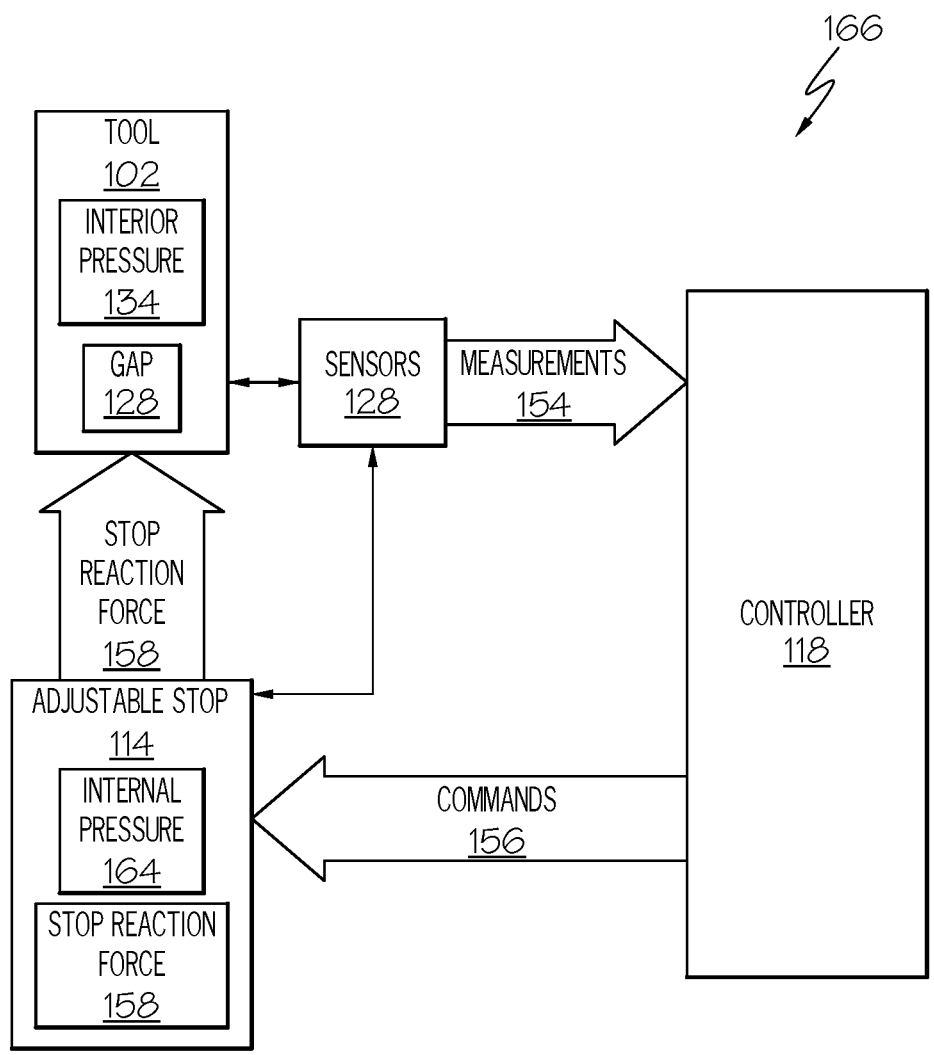
FIG. 8 is a schematic, block diagram of an example of a feedback loop of the system depicted in FIGS. 1A and 1B.
Figure 9:
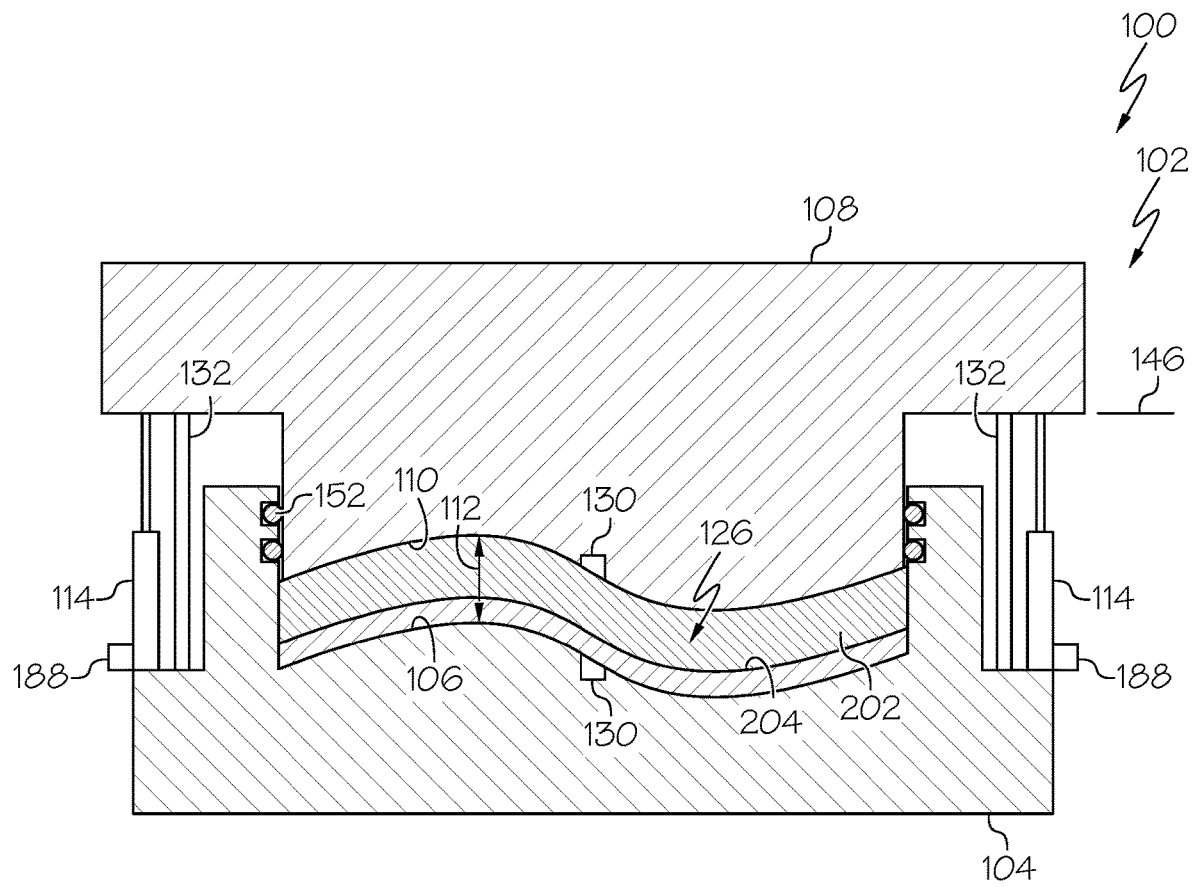
FIG. 9 is a schematic, sectional, end view of an example of the tool depicted in FIGS. 1A and 1B.

Referring to FIGS. 1A, 1B and 8, in one or more examples, the system 100 include one or more sensors 128. The sensors 128 measure and generate measurements 154 representing at least one of the interior pressure 134 within the tool cavity 126, the dimension 116 of the gap 112 between the base surface 106 and the lid surface 110; the internal pressure 164 of the adjustable stop 114, and/or the stop reaction force 158 applied by the adjustable stop 114. The pressure sensor 130, the gap measurement sensor 132, and the force sensor 188 are examples of the sensors 128. The dimension measurement 182, the pressure measurement 186, and the force measurement 192 are examples of the measurements 154.

In one or more examples, the system 100 includes a feedback loop 166. In one or more examples, the feedback loop 166 responds to changes in the interior pressure 134 within the tool cavity 126. In one or more examples, the feedback loop 166 responds to changes in the internal pressure 164 of the adjustable stop 114 and/or the stop reaction force 158. The feedback loop 166 also provides changes in at least one of the stop position 120 of the adjustable stop 114 and the stop reaction force 158 that is applied by the adjustable stop 114 to adjust the tool position 144 of the tool lid 108 and to maintain the constant value 170 for the interior pressure 134 within the tool cavity 126 and the constant pressure 216 applied across the resin-infused preform 206. In one or more examples, the controller 118 generates commands 156 and transmits the commands 156 to the adjustable stop 114 based on the measurements 154.

Referring to FIGS. 1A, 1B, 2-7 and 9, in one or more examples, the tool 102 and, more particularly, the tool base 104 and the tool lid 108 are configured for a desired shape, geometry, and contour of the composite structure 200 being formed. In one or more examples, at least one of the base surface 106 and the lid surface 110 is planar (e.g., FIGS. 2-7). In these examples, at least one of an inner mold line or an outer mold line of the composite structure 200 is planar. In one or more examples, at least one of the base surface 106 and the lid surface 110 is contoured (e.g., FIG. 9). In these examples, at least one of the inner mold line or the outer mold line of the composite structure 200 is contoured.

Figure 10:
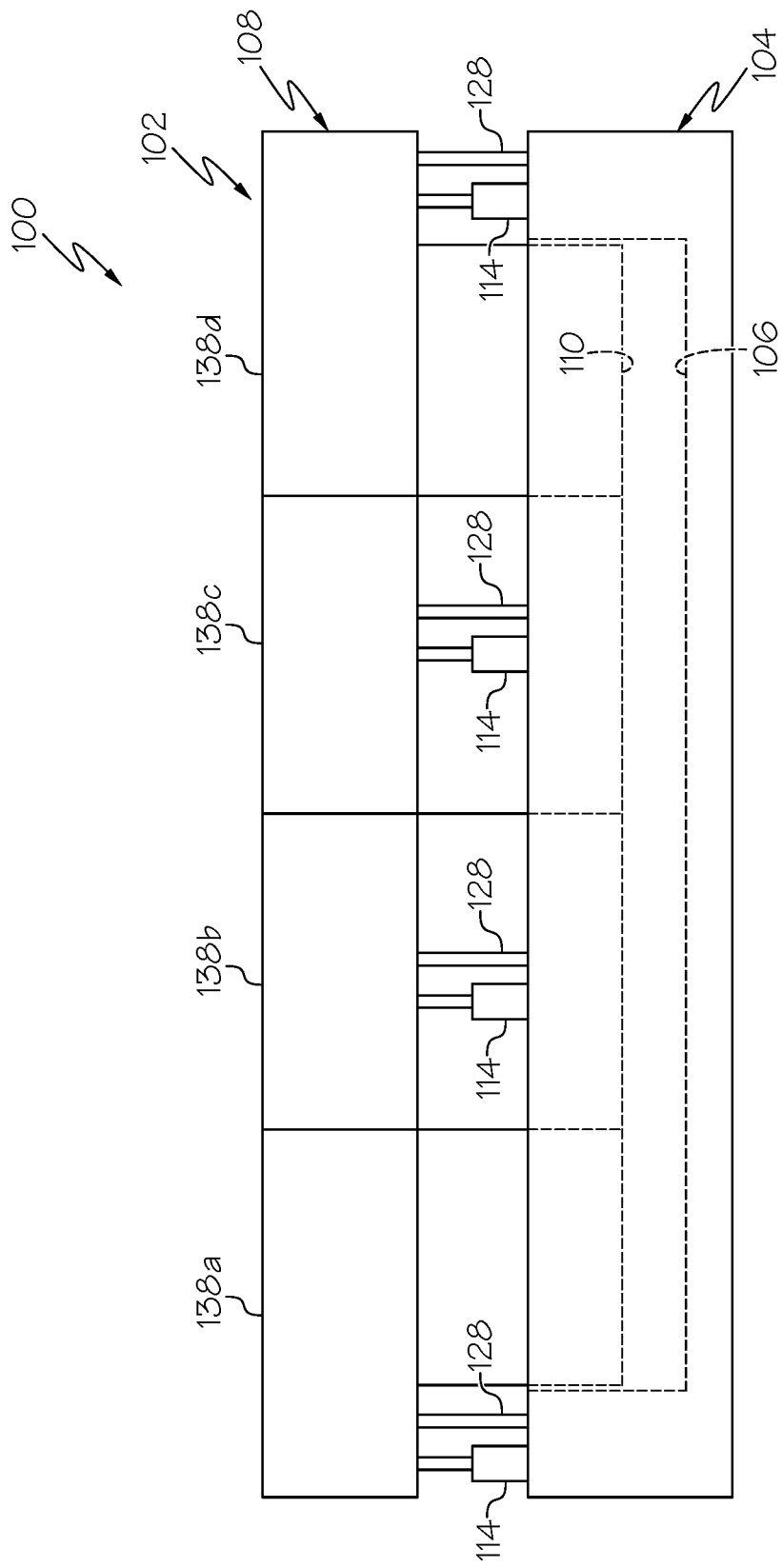
FIG. 10 is a schematic, side elevation view of an example of the tool depicted in FIGS. 1A and 1B.

Referring to FIGS. 1A, 1B, 2-7, 9 and 10, in one or more examples, the system 100 includes the plurality of adjustable stops 140. As shown in FIGS. 1A, 1B, 2-7 and 9, in one or more examples, the plurality of adjustable stops 140 is suitably dispersed between the tool base 104 and the tool lid 108. As illustrated in FIG. 10, in one or more examples, the tool lid 108 includes a plurality of lid sections 138. The example illustrated in FIG. 10 depicts the tool lid 108 as having four lid sections 138, identified as first lid section 138a, second lid section 138b, third lid section 138c, and fourth lid section 138d. However, the tool lid 108 can have any number of lid sections 138. At least one of the plurality of adjustable stops 140 (identified individually as the adjustable stop 114 in FIG. 10) is positioned between the tool base 104 and each one of the plurality of lid sections 138. Each one of the lid sections 138 is associated with a portion or section of the resin-infused preform 206. Accordingly, each one of the lid sections 138 includes the tool position 144 associated with the associated section of the resin-infused preform 206, which is controlled by corresponding ones of the adjustable stops 140 to set the thickness 208 and to maintain the interior pressure 134 and the predetermined pressure 214 corresponding to that section of the resin-infused preform 206.

Referring to FIGS. 1A and 1B, the adjustable stop 114 can include any suitable device or mechanism capable of reacting to the tool lid 108 and/or controlling the tool position 144 of the tool lid 108 during resin injection, resin infusion, and resin cure. In one or more examples, the adjustable stop 114 includes or takes the form of a linear actuator 124. Examples of the linear actuator 124 include hydraulic actuators (e.g., hydraulic cylinders), pneumatic actuators (e.g., pneumatic cylinders), and mechanical actuators (e.g., drive screws, motors, linear sliders, and the like). In one or more examples, the adjustable stop 114 includes or takes the form of a spring 136. In one or more examples, the adjustable stop 114 includes or takes the form of an inflatable bladder 196 (e.g., internally pressurized bladder). It can be appreciated that the type or function of the force sensor 188 and the type of the force measurement 192 generated by the force sensor 188 depends on the type of the adjustable stop 114.

Referring generally to FIGS. 1A, 1B and 2-10, by way of examples, the present disclosure is also directed to the tool 102 for infusing the resin 202 in the dry preform 204. In one or more examples, the tool 102 is used with or forms a portion of the system 100. As described herein above, the tool 102 provides control for maintaining a predetermined pressure or force on a resin-infused fiber-reinforced composite part during cure.

Referring to FIGS. 1A and 1B, in one or more examples, the tool 102 includes the tool base 104 that includes the base surface 106. The tool 102 includes the tool lid 108 that includes the lid surface 110. The tool 102 includes the adjustable stop 114 that is positioned between the tool base 104 and the tool lid 108. The base surface 106 and the lid surface 110 form a portion of the tool cavity 126. The dry preform 204 is infused with the resin 202 within the tool cavity 126 to form the resin-infused preform 206. The tool lid 108 is movable relative to the tool base 104 to generate the predetermined pressure 214 across the resin-infused preform 206 (e.g., characterized by the interior pressure 134 within the tool cavity 126). The adjustable stop 114 controls the tool position 144 of the tool lid 108 relative to the tool base 104 to maintain the predetermined pressure 214.

In one or more examples, the adjustable stop 114 controls movement of the tool lid 108 relative to the tool base 104 to selectively control at least one of the dimension 116 of the gap 112 between the base surface 106 and the lid surface 110 and/or the interior pressure 134 within the tool cavity 126. In one or more examples, the tool 102 includes the sensors 128 that measures at least one of the interior pressure 134 within the tool cavity 126, the dimension 116 of the gap 112 between the base surface 106 and the lid surface 110, the internal pressure 164 of the adjustable stop 114, and/or the stop reaction force 158. In one or more examples, the tool 102 includes the feedback loop 166 that responds to changes in the interior pressure 134 within the tool cavity 126 and/or that provides changes in at least one of the stop position 120 of the adjustable stop 114 and the stop reaction force 158 applied by the adjustable stop 114 to maintain a constant value for the interior pressure 134 within the tool cavity 126.

Figure 11:
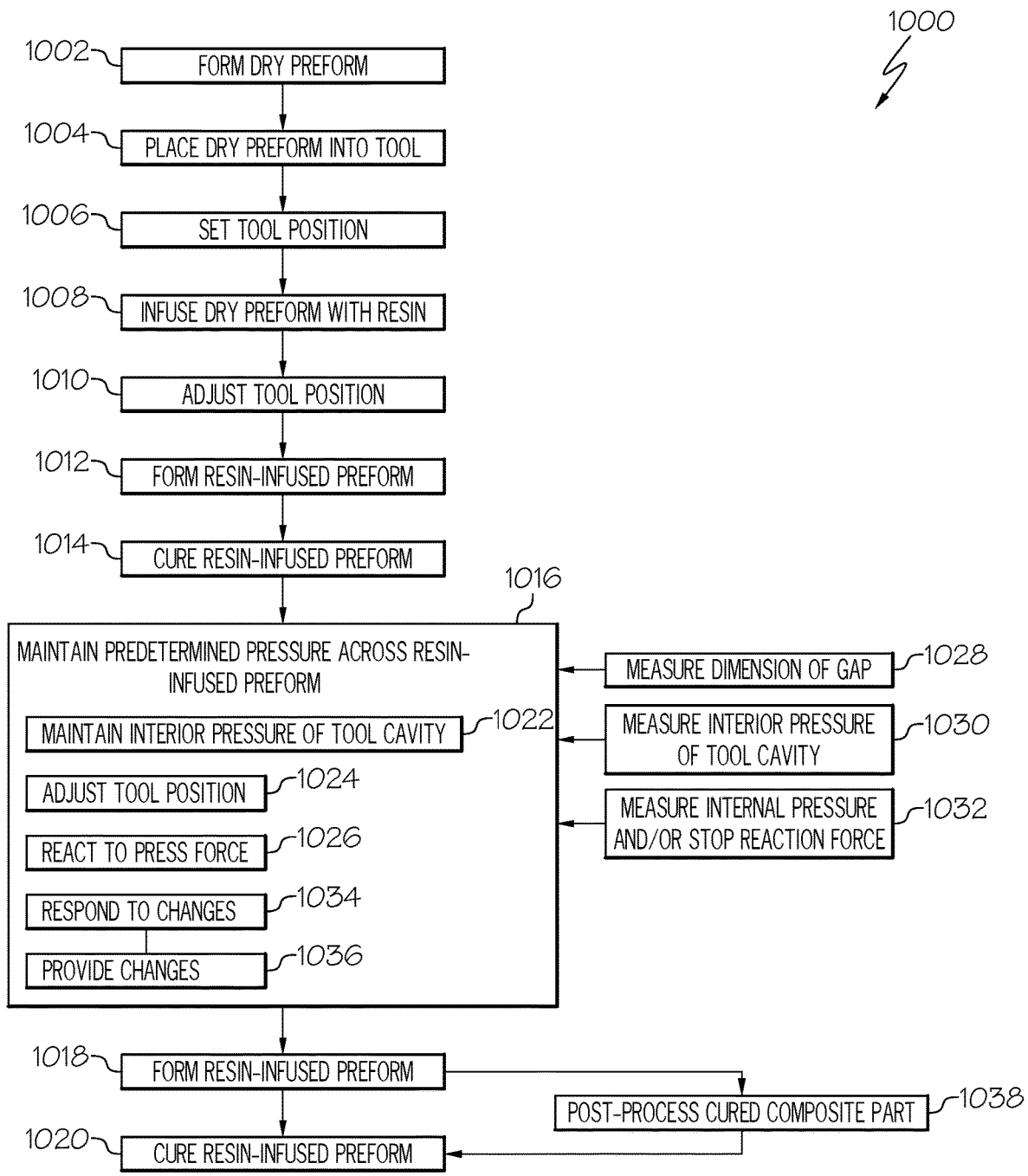
FIG. 11 is a method flow diagram of an example of a method for forming a composite structure.

Referring generally to FIGS. 1A, 1B and 2-10 and particularly to FIG. 11, by way of examples, the present disclosure is directed to a method 1000 for forming the composite structure 200. Examples of the method 1000 are implemented using the system 100 and/or the tool 102. As will be described in more detail herein, the method 1000 facilitates tool control for maintaining a constant pressure or force on a resin-infused fiber-reinforced composite part during a cure process.

Referring to FIG. 11, in one or more examples, the method 1000 includes a step of (block 1002) forming the dry preform 204 and a step of (block 1004) placing the dry preform 204 in the tool 102. In one or more examples, the method 1000 includes a step of (block 1006) setting the tool position 144 of the tool lid 108 of the tool 102 relative to the tool base 104 of the tool 102. In one or more examples, the tool position 144 is set to facilitate injection of the resin 202 within the tool cavity 126 such that the resin 202 fills the gap 112 and flows over the dry preform 204. In one or more examples, the tool position 144 is set such that the gap 112 corresponds to the thickness 208 desired for the resin-infused preform 206. As an example, the tool position 144 is set to achieve the first predetermined value 172 for the dimension 116 of the gap 112 between the base surface 106 of the tool base 104 and the lid surface 110 of the tool lid 108 for injection of the resin 202. In one or more examples, the tool position 144 is set before infusing the resin 202. In one or more examples, the first predetermined value 172 for the dimension 116 of the gap 112 is selected to sufficiently enable the resin 202 to flow into the tool cavity 126 and across an entirety of a surface of the dry preform 204.

In one or more examples, the method 1000 includes a step of (block 1008) infusing the dry preform 204 positioned within the tool cavity 126 of the tool 102 with the resin 202 to form the resin-infused preform 206. In one or more examples, the method 1000 includes a step of (block 1010) adjusting the tool position 144 of the tool lid 108 relative to the tool base 104, as needed, for infusion of the resin 202 and/or cure of the resin-infused preform 206. In one or more examples, the tool position 144 is adjusted to achieve the second predetermined value 174 for the dimension 116 of the gap 112 that corresponds to the thickness 208 of the resin-infused preform 206. In one or more examples, the tool position 144 is adjusted before infusing the resin. In one or more examples, the tool position 144 is adjusted after infusing the resin 202. As an example, the second predetermined value for the dimension 116 of the gap 112 is selected to correspond to a desired value for the thickness 208 of the resin-infused preform 206 after the resin 202 flows into the tool cavity 126 and across the entirety of the surface of the dry preform 204. In one or more examples, the second predetermined value 174 for the dimension 116 of the gap 112 is approximately the same as the first predetermined value 172 for the dimension 116 of the gap 112.

In one or more examples, the method 1000 includes a step of (block 1012) forming the resin-infused preform 206 within the tool cavity 126. The method 1000 includes a step of (block 1014) curing the resin-infused preform 206 within the tool cavity 126. The method 1000 includes a step of (block 1016) maintaining a predetermined pressure 214 across the resin-infused preform 206 during the step of (block 1014) curing. The method 1000 includes a step of (block 1018) forming the cured composite part 212 within the tool cavity 126. The method 1000 includes a step of (block 1020) removing the cured composite part 212 from the tool 102.

The resin-infused preform 206 is cured at the predetermined pressure 214. In one or more examples the predetermined pressure 214 is the constant pressure 216. For example, the value for the pressure applied across the resin-infused preform 206 during curing is constant. In one or more examples, the step of (block 1016) maintaining the predetermined pressure 214 includes a step of (block 1022) maintaining the interior pressure 134 within the tool cavity 126 at a predetermined value 168, such as the constant value 170, in response to a decrease in the volume 210 (e.g., shrinkage) of the resin-infused preform 206 during the step of (block 1014) curing. In one or more examples, the step of (block 1016) maintaining the predetermined pressure 214 includes a step of (block 1024) adjusting the tool position 144, such as by reducing the dimension 116 of the gap 112 and lowering the tool lid 108, in response to a decrease in the volume 210 (e.g., shrinkage) of the resin-infused preform 206 during the step of (block 1014) curing. In one or more examples, the step of (block 1016) maintaining the predetermined pressure 214 includes a step of (block 1026) reacting to the press force 160 of the tool lid 108, in response to a decrease in the volume 210 (e.g., shrinkage) of the resin-infused preform 206 during the step of (block 1014) curing.

In one or more examples, the resin-infused preform 206 is cured at a predetermined, such as a constant, curing temperature. The curing temperature can be set according to the resin 202. For example, some aerospace epoxy resins cure initially at 130° C., but fully cure at a temperature of about 170° C. to 190° C. Accordingly, in one or more examples, the curing temperature can be set at a temperature from approximately 100° C. to about 200° C.

In one or more examples, the resin-infused preform 206 is cured for a predetermined curing time. The curing time can be set to maximize production rate of the. For example, the curing time can be set to cure the resin-infused preform 206 to a point where it can be removed from the tool 102 without damaging the resin-infused preform 206. In other examples, the curing time can be set to fully cure the resin-infused preform 206 in the tool 102.

In one or more examples, the method 1000 includes a step of (block 1028) measuring the dimension 116 of the gap 112 between the base surface 106 and the lid surface 110. In one or more examples, measurements of the dimension 116 of the gap 112 are used to control (e.g., set and/or adjust) the tool position 144 of the tool lid 108 relative to the tool base 104. For example, as needed, a change in the tool position 144 can be based on the measurements of the dimension 116, which is correlated to a predetermined rate of volumetric decrease over time based on the type and/or composition of the resin 202 and/or the cure parameters (e.g., pressure, temperature, time) of the curing process.

In one or more examples, the step of (block 1016) maintaining the predetermined pressure 214 across the resin-infused preform 206 during cure is performed passively. In one or more examples, the method 1000, such as the step of (block 1016) maintaining the predetermined pressure, includes the step of (block 1026) reacting to the press force 160 applied by the tool lid 108 in response to the decrease in the preform reaction force 162 applied by the resin-infused preform 206 to maintain the predetermined pressure (214), such as the predetermined value for the interior pressure 134 of the tool cavity 126. In these examples, the step of (block 1026) reacting is performed by the adjustable stop 114 and can be considered a passive technique for maintaining the predetermined pressure and/or for balancing forces. For example, when the press force 160 becomes greater than the sum of the preform reaction force 162 and the stop reaction force 158, the press force 160 applied by the tool lid 108 overcomes the stop reaction force 158 applied by the adjustable stop 114. In turn, the tool position 144 is adjusted (e.g., the tool lid 108 is moved further toward the tool base 104) until the lid surface 110 contacts the preform surface of the resin-infused preform 206 until the sum of the preform reaction force 162 and the stop reaction force 158 equal the press force 160. At this equilibrium state, stop reaction force 158 applied by the adjustable stop 114 prevents the tool lid 108 from moving further or applying a greater pressure on the resin-infused preform 206.

In one or more examples, the step of (block 1016) maintaining the predetermined pressure 214 across the resin-infused preform 206 during cure is performed actively, such as in response to measurements 154 and under command from the controller 118. In one or more examples, the method 1000, such as the step of (block 1016) maintaining the predetermined pressure 214, includes the step of (block 1024) adjusting the tool position 144 of the tool lid 108 of the tool 102 relative to the tool base 104 of the tool 102 to maintain the predetermined value, such as the constant value, for the interior pressure 134 and, thereby, the predetermined pressure 214 across the resin-infused preform 206, during the step of (block 1014) curing the resin-infused preform 206. In these examples, the step of (block 1024) adjusting the tool position 144 is performed by the adjustable stop 114 and can be considered an active technique for maintaining the predetermined pressure 214 and/or for balancing forces.

In one or more examples, the method 1000 includes a step of (block 1030) measuring the interior pressure 134 within the tool cavity 126. Measurements of the interior pressure 134 of the tool cavity 126 are used to control (e.g., selectively adjust) the tool position 144 of the tool lid 108 relative to the tool base 104. For example, as needed, a change in the tool position 144 (e.g., from the second predetermined value 174 for the dimension 116 of the gap 112 to the third predetermined value 176 for the dimension 116 of the gap 112) is based on the measurements of the interior pressure 134 of the tool cavity 126 to maintain the predetermined pressure 214, to balance forces, and/or to accommodate for the decrease in the volume 210 (e.g., shrinkage) of the resin-infused preform 206 during cure.

In one or more examples, measurements of the dimension 116 of the gap 112 are used to control (e.g., selectively adjust) the tool position 144 of the tool lid 108 relative to the tool base 104. For example, as needed, a change in the tool position 144 (e.g., from the second predetermined value 174 for the dimension 116 of the gap 112 to the third predetermined value 176 for the dimension 116 of the gap 112) is based on the measurements of the dimension 116 of the gap 112 and predictions of volumetric decreases over time of the resin-infused preform 206 to maintain the predetermined pressure 214, to balance forces, and/or to accommodate for the decrease in the volume 210 (e.g., shrinkage) of the resin-infused preform 206 during cure.

In one or more examples, the method 1000 includes a step of (block 1032) measuring at least one of the internal pressure 164 of the adjustable stop 114 and/or the stop reaction force 158 applied to the tool lid 108 by the adjustable stop 114. Measurements of the internal pressure 164 and/or the stop reaction force 158 are used to control (e.g., selectively adjust) the tool position 144 of the tool lid 108 relative to the tool base 104. For example, as needed, a change in the tool position 144 (e.g., from the second predetermined value 174 for the dimension 116 of the gap 112 to the third predetermined value 176 for the dimension 116 of the gap 112) is based on the measurements of stop reaction force 158 to maintain the predetermined pressure 214, to balance forces, and/or to accommodate for the decrease in the volume 210 (e.g., shrinkage) of the resin-infused preform 206 during cure.

In one or more examples, the step of (block 1016) maintaining the predetermined pressure 214 across the resin-infused preform 206 during cure is performed using the feedback loop 166. In one or more examples, the method 1000 includes a step of (block 1034) responding to changes in the interior pressure 134 within the tool cavity 126. The method 1000 also includes a step of (block 1036) providing changes in at least one of the stop position 120 of the adjustable stop 114, positioned between the tool base 104 of the tool 102 and the tool lid 108 of the tool 102, and the stop reaction force 158 applied by the adjustable stop 114 to maintain the predetermined pressure 214 across the resin-infused preform 206 (e.g., predetermined or constant value for the interior pressure 134 within the tool cavity 126).

In one or more examples, the method 1000 can also include a step of (block 1038) post-processing the cured composite part 212. An example of post-processing includes additional curing of the cured composite part 212 at a temperature higher than the curing temperature. In these examples, the method 1000 includes a step of transferring the cured composite part 212 to a post-cure fixture.

Referring to FIGS. 1A and 1B, in one or more examples, the controller 118 is adapted or configured to execute instructions and to provide operational commands to components of the system 100, such as to the adjustable stops 140. As an example, the adjustable stop 114 is activated and operates under direction of the controller 118. In one or more examples, the controller 118 is programmed with instructions (e.g., in the form of program code) that, when executed by the controller 118, causes the controller 118 to perform operations. In one or more examples, the controller 118 includes or takes the form of a computing device (e.g., one or more computers). In these examples, the method 1000 is at least partially a computer-implemented method.

In one or more examples, the controller 118 includes or takes the form of a data processing system. In one or more examples, the data processing system of the controller 118 includes a communications framework, which provides communications between a processor 122 and memory 198 (e.g., one or more storage devices). The processor 122 serves to execute instructions for software that can be loaded into the memory 198. In one or more examples, the processor 122 is a number of processor units, a multi-processor core, or some other type of processor, depending on the particular implementation. The memory 198 is an example of a storage device or any piece of hardware that is capable of storing information, such as, for example, without limitation, at least one of data, program code in functional form, or other suitable information either on a temporary basis, a permanent basis, or both on a temporary basis and a permanent basis. The memory 198 may also be referred to as computer readable storage devices in one or more examples. The memory 198 is, for example, a random-access memory or any other suitable volatile or non-volatile storage device. Instructions for at least one of the operating system, applications, or programs can be located in the memory 198, which is in communication with the processor 122. The processes of the various examples and operations described herein can be performed by the processor 122 using computer-implemented instructions, which can be located in a memory, such as the memory 198. The instructions are also referred to as program code, computer usable program code, or computer readable program code that can be read and executed by the processor 122. The program code in the different examples can be embodied on different physical or computer readable storage media, such as the memory 198. In one or more examples, the program code is located in a functional form on computer readable media that is selectively removable and can be loaded onto or transferred to the data processing system for execution by the processor. In one or more examples, the program code and computer readable media form a computer program product. Additionally, various components of the controller 118 and/or the data processing system may be described as modules. For the purpose of the present disclosure, the term "module" includes hardware, software or a combination of hardware and software. As an example, a module can include one or more circuits configured to perform or execute the described functions or operations of the executed processes described herein. As another example, a module includes a processor, a storage device (e.g., a memory), and computer-readable storage medium having instructions that, when executed by the processor causes the processor to perform or execute the described functions and operations. In one or more examples, a module takes the form of program code and computer readable media, together forming a computer program product.

In one or more examples, the system 100 is implemented using software, hardware, firmware, or a combination thereof. When software is used, the operations performed by the system 100 are implemented using, for example, without limitation, the program code that is configured to run on the processor 122. When firmware is used, the operations performed by the system 100 may be implemented using, for example, without limitation, the program code and data stored in the memory 198 to run on the processor 122. When hardware is employed, the hardware may include one or more circuits that operate to perform the operations performed by the system 100. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device Referring to FIGS. 1A and 1B, for the purpose of the present disclosure, the composite structure 200 includes any suitable composite part, article, object, component, and the liked, such as an aerospace composite structure used to form a fuselage, wings, and other components of an aircraft. The composite structure 200 includes or refers to the cured composite part 212. The cured composite part 212 is formed by infusing the dry preform 204 with the resin 202 to form the resin-infused preform 206 and then curing the resin-infused preform 206. The dry preform 204 includes any suitable fiber reinforcement material. In one or more examples, the dry preform 204 is formed from raw fiber material that is cut into a desired pattern. As an example, plies of raw material are cut into flat patterns and the flat patterns are formed into the dry preform 204. For example, the dry preform 204 can include from 1 to 8 plies of a fibrous material with any suitable per-ply areal weight. The raw material can include carbon fiber, glass fiber, aramid fiber, and the like or combinations thereof with a knit thread, with a knit thread and a thermoplastic veil, or fiber with a veil. As examples, the dry preform 204 includes carbon-fiber-based fabrics, such as non-crimp fabrics (NCFs). The resin 202 includes any suitable matrix material, such as an epoxy resin. The resin 202 can have a period of latency. In other examples, the resin 202 includes epoxies, cyanate esters, benzoxazines, bismaleimides, polyimides, cross-linkable thermoplastics, and in situ polymerizable thermoplastics, or combination thereof. For example, the resin 202 can include, without limitation, epoxy/cyanate esters and epoxy/benzoxazines.

For the purpose of the present disclosure, the term "cured" refers to a sufficient degree of stiffness and strength in the composite part, such that the composite part can be safely removed from a mold tool. As an example, the cured composite part 212 refers to a composite part that is sufficiently cured to maintain its shape without any distortion or damage after removal from the tool. In some examples, after removal from the tool, additional curing, or post-curing, can be performed to further develop additional stiffness and strength within the composite part to meet desired targets.

Figure 12:
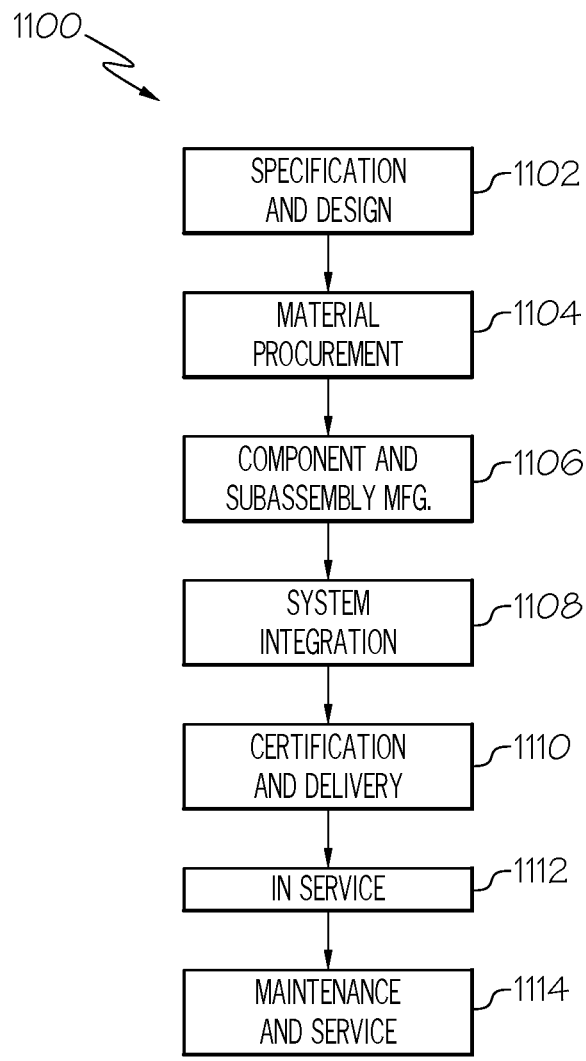
FIG. 12 is a flow diagram of an example of an aircraft manufacturing and service method.
Figure 13:
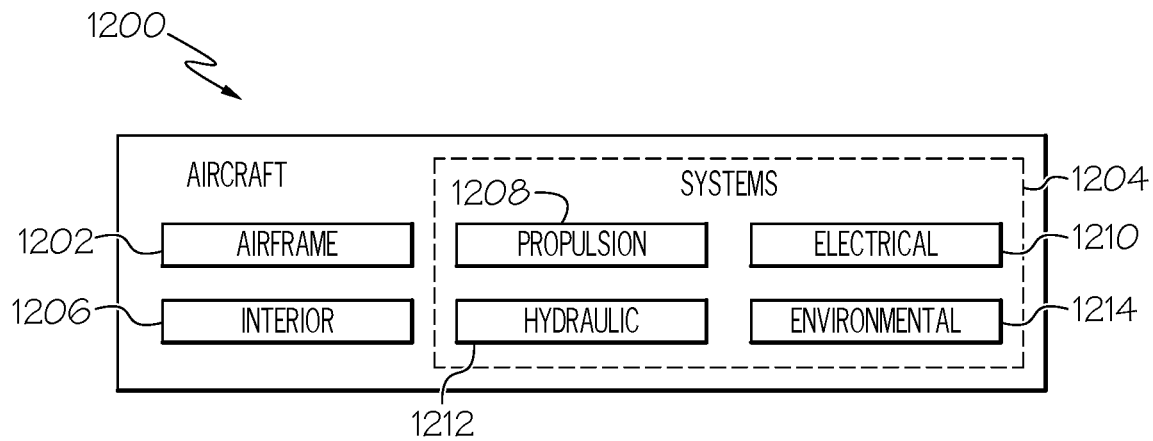
FIG. 13 is a schematic block diagram of an example of an aircraft.

Referring now to FIGS. 12 and 13, examples of the system 100, the tool 102, and the method 1000 described herein, may be related to, or used in the context of, an aircraft manufacturing and service method 1100, as shown in the flow diagram of FIG. 12 and an aircraft 1200, as schematically illustrated in FIG. 13. For example, the aircraft 1200 and/or the aircraft production and service method 1100 may include the composite structure 200 that is formed using the system 100 and/or the tool 102 and/or according to the method 1000.

Referring to FIG. 13, which illustrates an example of the aircraft 1200. The aircraft 1200 includes an airframe 1202 having an interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like. The aircraft 1200 may include various other composite structures made using the system 100 and/or the tool 102 and/or according to the method 1000.

Referring to FIG. 12, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 12 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100, the tool 102, and the method 1000 shown and described herein, may be employed during any one or more of the stages of the manufacturing and service method 1100 shown in the flow diagram illustrated by FIG. 12. In an example, forming the composite structure 200 using the system 100 and/or the tool 102 and/or according to the method 1000 may form a portion of component and subassembly manufacturing (block 1106) and/or system integration (block 1108). Further, the composite structure 200 formed using the system 100 and/or the tool 102 and/or according to the method 1000 may be implemented in a manner similar to components or subassemblies prepared while the aircraft 1200 is in service (block 1112). Also, the composite structure 200 formed using the system 100 and/or the tool 102 and/or according to the method 1000 may be utilized during system integration (block 1108) and certification and delivery (block 1110). Similarly, the composite structure 200 formed using the system 100 and/or the tool 102 and/or according to the method 1000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

For the purpose of the present disclosure, the term "constant," for example, referring to a constant pressure, a constant value, and the like, refers to a value (e.g., a pressure value) having a variance of less than approximately 5% of the desired, stated value.

FIGS. 1A, 1B, 2-10 and 13, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1A, 1B, 2-10 and 13, referred to above, need be included in every example and not all elements, features, and/or components described herein are necessarily depicted in each illustrative example. Accordingly, some of the elements, features, and/or components described and illustrated in FIGS. 1A, 1B, 2-10 and 13 may be combined in various ways without the need to include other features described and illustrated in FIGS. 1A, 1B, 2-10 and 13, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1A, 1B, 2-10 and 13, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1A, 1B, 2-10 and 13, and such elements, features, and/or components may not be discussed in detail herein with reference to each of FIGS. 1A, 1B, 2-10 and 13. Similarly, all elements, features, and/or components may not be labeled in each of FIGS. 1A, 1B, 2-10 and 13, but reference numerals associated therewith may be utilized herein for consistency.

In FIGS. 11 and 12, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 11 and 12 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the tool 102, and the method 1000 have been shown and described, modifications may occur to those skilled in the art upon reading the specification. The present application includes such modifications and is limited only by the scope of the claims.

What is claimed is:

1. A system for forming a composite structure, the system comprising:
    a tool for infusing a dry preform with a resin, wherein the tool comprises:
        a tool base that comprises a base surface, the base surface forming a base portion of a tool cavity; and
        a tool lid that comprises a plurality of lid sections that form a lid surface, the lid surface forming a lid portion of the tool cavity, and each one of the lid sections is movable relative to the tool base in response to application of a press force for generating an interior pressure within the tool cavity;
        a plurality of adjustable stops that is positioned between the tool base and the tool lid and that is configured to react to the press force applied to the tool lid; and
        a controller that is in communication with the adjustable stop and that comprises a processor programmed to instruct the adjustable stops to independently adjust a position of each one of the lid sections relative to the tool base for maintaining the curing pressure over time in response to a reduction in a volume of the resin.

2. The system of claim 1, further comprising a gap measurement sensor that measures a dimension of a gap between the base surface and the lid surface and that transmits dimension measurements to the processor for instructing the adjustable stops,
    wherein the processor instructs the adjustable stops to adjust the position of the lid sections relative to the tool base based on the dimension measurement.

3. The system of claim 2, wherein the processor is programmed to compare the dimension measurement to a model of a resin-infused preform that represents changes in the volume of the resin over time during cure.

4. The system of claim 1, further comprising a pressure sensor that measures the interior pressure within the tool cavity and that transmits pressure measurements to the processor for instructing the adjustable stops,
    wherein the processor instructs the adjustable stops to adjust the position of the lid sections relative to the tool base based on the pressure measurement.

5. The system of claim 4, wherein the processor comprises a feedback loop that:
    responds to changes in the interior pressure; and
    provides changes in a stop position of the adjustable stops to maintain a constant value for the curing pressure applied to the resin and the dry preform within the tool cavity.

6. The system of claim 1, further comprising a force sensor that measures a stop reaction force applied to the tool lid by the adjustable stops in opposition to the press force and that transmits force measurements to the processor for instructing the adjustable stops,
    wherein the processor instructs the adjustable stops to adjust the position of the lid sections relative to the tool base based on the force measurement.

7. The system of claim 1, further comprising sensors that measure the interior pressure within the tool cavity, a dimension of a gap between the base surface and the lid surface, and a stop reaction force applied to the tool lid by the adjustable stops in opposition to the press force,
    wherein the processor instructs the adjustable stops to adjust the position of the lid sections relative to the tool base based on pressure measurements, dimension measurements, force measurements.

8. The system of claim 7, the processor comprises a feedback loop that:
    responds to changes in at least one of the interior pressure, the dimension of the gap, and the stop reaction force; and
    provides changes in at least one of a stop position of the adjustable stops and the stop reaction force to maintain a constant value for the curing pressure applied to the resin and the dry preform within the tool cavity.

9. The system of claim 7, wherein the processor comprises a feedback loop that:
responds to changes in the stop reaction force; and
provides changes in the stop reaction force of the adjustable stops to maintain a constant value for the curing pressure applied to the resin and the dry preform within the tool cavity.

10. The system of claim 1, wherein at least one of the adjustable stops comprises a linear actuator.

11. The system of claim 1, wherein at least one of the adjustable stops comprises an inflatable bladder.

12. A tool for forming composite structure, the tool comprising:
a tool base that comprises a base surface forming a base portion of a tool cavity;
a tool lid that comprises a lid surface forming a lid portion of the tool cavity and that is movable relative to the tool base in response to application of a press force for generating an interior pressure within the tool cavity;
an inflatable bladder that is positioned between the tool base and the tool lid and that is configured to: react to the press force applied to the tool lid; and
adjust a position of the tool lid relative to the tool base in response to changes in at least one of the interior pressure, a dimension of a gap between the base surface and the lid surface, and a stop reaction force applied to the tool lid by the inflatable bladder in opposition to the press force for maintaining the curing pressure over time due to a reduction in a volume of the resin-infused preform.

13. The system of claim 12, wherein:
the tool lid comprises a plurality of lid sections; and
a position of each one of the lid sections relative to the tool base is independently adjusted by one of a plurality of adjustable stops.

14. A method for forming a composite structure, the method comprising steps of:
placing a dry preform within a tool cavity of a tool formed by a tool base and a tool lid, the tool lid comprising a plurality of lid sections;
applying a press force to the tool lid to move the tool lid toward the tool base;
reacting to the press force with a plurality of adjustable stops located between the tool base and the tool lid;
infusing the dry preform with a resin; and
controlling the adjustable stops to independently adjust a position of the each one of the lid sections relative to the tool base for maintaining the curing pressure over time in response to a reduction in a volume of the resin-infused preform during cure.

15. The method of claim 14, further wherein the step of controlling the adjustable stops to adjust the position of the lid sections relative to the tool base comprises reacting to the press force applied by the tool lid of the tool in response to a decrease in a preform reaction force applied by the resin-infused preform.

16. The method of claim 14, further comprising:
setting a first position of the tool lid of the tool relative to the tool base of the tool before the step of infusing the dry preform with the resin such that a cavity volume is at least approximately equal to a volume of the dry preform and the resin; and
setting a second position of the tool lid relative to the tool base after the step of infusing the dry preform with the resin such that the cavity volume is decreased.

17. The method of claim 14, further comprising:
measuring a dimension of a gap between a base surface of the tool base and a lid surface of the tool lid; and
automatically adjusting the position of the lid sections relative to the tool base over time in response to dimension measurements to maintain a constant value for the curing pressure during cure of the resin-infused preform.

18. The method of claim 14, further comprising:
measuring an interior pressure within the tool cavity; and
automatically adjusting the position of the lid sections relative to the tool base over time in response to pressure measurements to maintain a constant value for the curing pressure during cure of the resin-infused preform.

19. The method of claim 14, further comprising:
measuring a stop reaction force applied to the tool lid by the adjustable stops in opposition to the press force; and
automatically adjusting the position of the lid sections relative to the tool base of the tool in response to force measurements to maintain a constant value for the curing pressure during cure of the resin-infused preform.

20. The method of claim 14, further comprising:
responding to changes in an interior pressure within the tool cavity, a gap between a base surface of the tool base and a lid surface of the tool lid, and a stop reaction force applied to the tool lid by the adjustable stops in opposition to the press force; and
providing changes in at least one of a stop position of the adjustable stops and the stop reaction force applied by the adjustable stops to maintain a constant value for the curing pressure across the resin-infused preform.

* * * * *